Jan. 11, 1966     H. KRAMER     3,229,015
PROCESS FOR DRAWING A SYNTHETIC LINEAR POLYMER THREAD
Filed Aug. 7, 1962     2 Sheets-Sheet 1
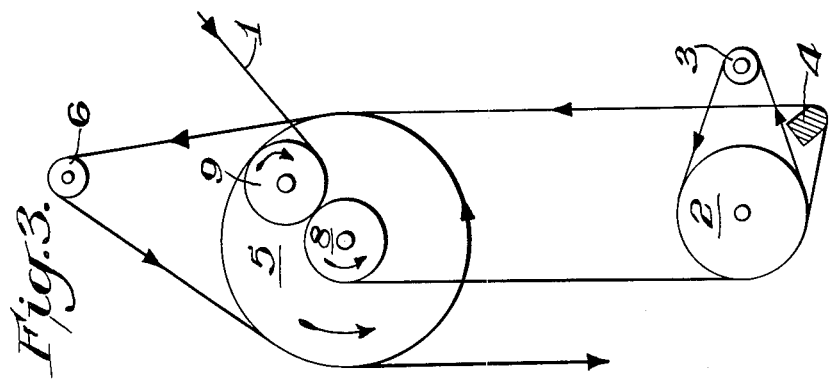
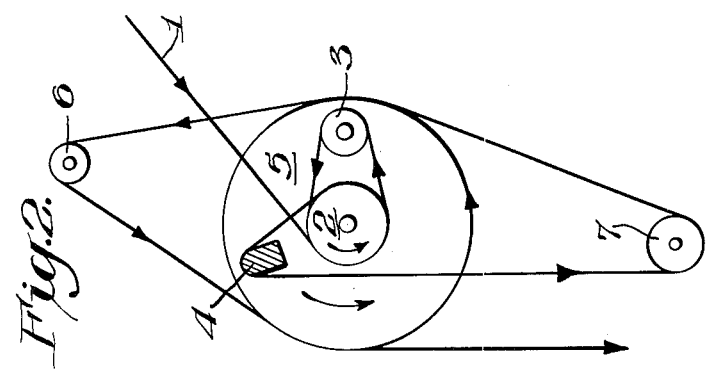
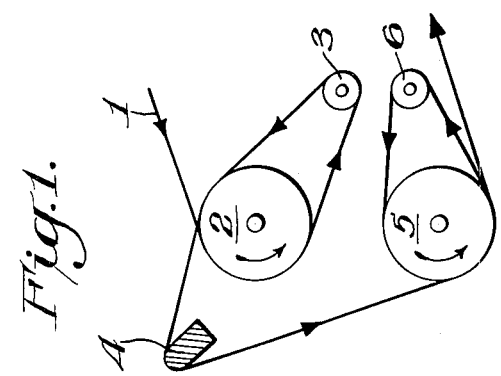
INVENTOR
*Helmut Kramer*
BY *Connolly and Hutz*
ATTORNEYS Jan. 11, 1966          H. KRAMER          3,229,015
PROCESS FOR DRAWING A SYNTHETIC LINEAR POLYMER THREAD
Filed Aug. 7, 1962          2 Sheets-Sheet 2
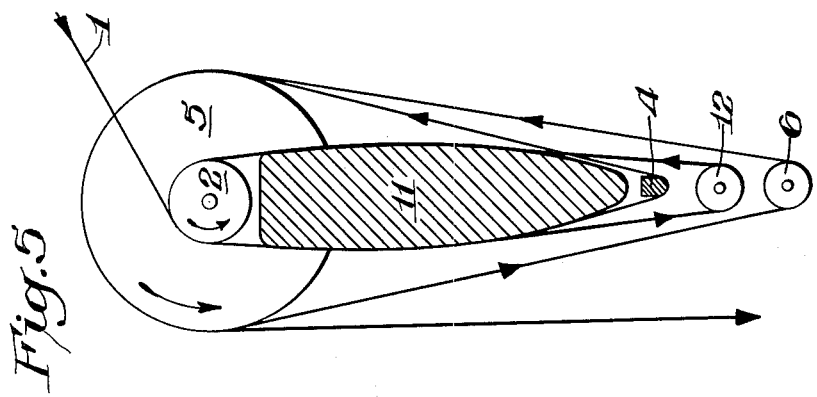
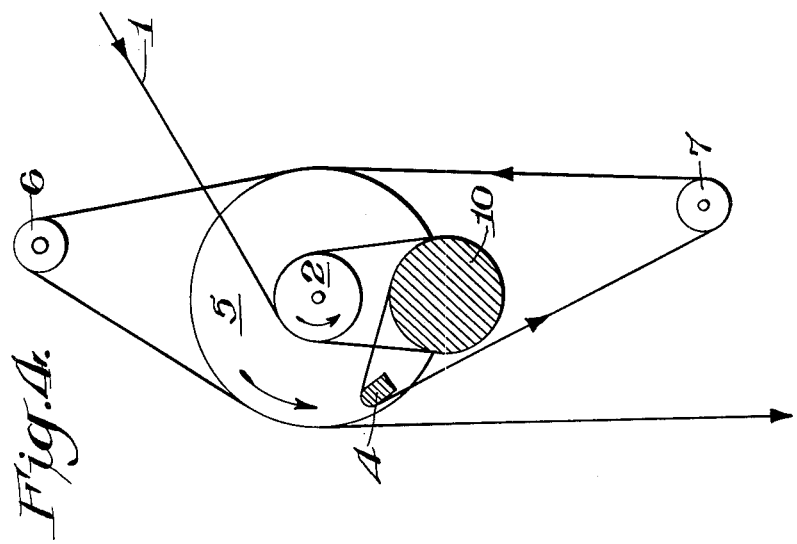
INVENTOR
*Helmut Kramer*
BY *Connolly and Hutz*
ATTORNEYS 3,229,015
PROCESS FOR DRAWING A SYNTHETIC LINEAR POLYMER THREAD
Helmut Kramer, Augsburg, Germany, assignor to Farbwerke Hoechst Aktiengesellschaft vormals Meister Lucius & Brüning, Frankfurt am Main, Germany, a corporation of Germany
Filed Aug. 7, 1962, Ser. No. 215,445
Claims priority, application Germany, Aug. 9, 1961,
F 34,642
9 Claims. (Cl. 264—290)

The present invention relates to a process for continuously and uniformly drawing threads of linear polymers of high molecular weight.

Spun threads of synthetic linear polymers of high molecular weight must be drawn to a multiple of their original length in order to impart to them the essential textile properties.

In general, threads are continuously drawn by passing them at a constant speed over a feed roll and drawing them off over a second roll rotating at a higher speed. Threads of high polymers which are in a glass-like state at 20° C. (cf., Stuart, "Die Physik der Hochpolymeren," volume III, page 608) i.e., which have a higher second order transition temperature, for example threads of polyethylene terephthalate, must be heated between the two rolls, since otherwise a drawing is impossible. In many cases the threads are heated by passing them with friction over a heated round body on which they are drawn.

Another arrangement comprises, between the two rolls, a stationary preheating body and a heated drawing pin around which the thread is wrapped once, whereby the area within which the drawing is performed is limited. Alternatively, a heated feed roll can be used, on which the thread is heated prior to being drawn. All these methods yield, however, threads the properties of which are more or less non-uniform. The non-uniformity of the various properties, for example titer, tensile strength, elongation at break and, above all, dyeability, indicates that the threads were drawn in non-uniform manner.

Besides, the known processes present other disadvantages, particularly technical difficulties.

It has now been found that threads of synthetic linear polymers of high molecular weight, which are in a glass-like state at room temperature, preferably threads of polyethylene terephthalate, can be drawn continuously and uniformly by wrapping the undrawn thread running off from a coil several times around a uniformly driven roll whereby it is heated to 60–85° C., passing the filament with an arc of less than 180° with contact over a rounded edge heated to 95–150° C., in a manner such that it touches the round edge over a distance of less than 15 mm., and drawing off the thread over a roll having a higher adjustable speed, with or without further heating.

The number of wrappings of the thread around the uniformly driven roll is practically unlimited. By this step the thread can be heated for a sufficiently long time under slight tension. The thread shall be heated to 60–85° C. and preferably to a temperature which is a little below the temperature at which a jump is observed in the drawing tension-temperature characteristic.

While being wrapped around the uniformly driven roll, the thread can be heated by various methods. It is possible to heat the uniformly driven roll to 60–85° C. and to pass the thread several times around that roll by means of an intermediate roll. Since it is often difficult uniformly to heat a driven roll the thread can be heated by a stationary body heated to 60–85° C., from which body it is passed to the uniformly driven roll. It is possible, for example, to use, instead of an intermediate roll, a stationary roll heated to 60–85° C. from which the thread is fed to the driven roll.

Alternatively, a stationary flat body heated to 60–85° C. can be used for heating and wrapping the thread around the uniformly driven roll. It is of advantage not to pass the thread over the narrow side of the flat body so that no drawing can occur, but to use a freely running roll for reversing the thread. The uniformly driven roll may additionally be heated to 60–85° C.

The thread which has thus been heated to a temperature in the range of 60–85° C. is drawn on the rounded and heated edge which has a temperature of 95–150° C. and preferably 100–110° C.

As rounded edge there is suitably used a body, the cross section of which forms a segment. A round bar can likewise be used provided that the thread is wrapped there around in an arc of less than 180°. The radius of the circle should advantageously be as small as possible so that the thread touches the heated edge only over a distance of less than 15 mm. By using a rounded edge the threaded is mechanically not damaged.

It is especially advantageous to use a rounded edge having a sintered ceramic surface with high mirror finish. Sintered ceramic is very resistant to damages by the running thread so that incisions into the surface and injuries to the thread are avoided. Since sintered ceramic has a small heat conductivity only it is advantageous to apply the surface of sintered ceramic to metals that are good heat conductors.

The tension of the thread on the uniformly driven roll is only small, whereas the tension on the heated edge increases suddenly due to the increased draw-off speed. The increase in tension coincides with the increase in temperature in the thread by the higher temperature of the edge. The draw point is thus localized by the sudden increase in temperature and tension on the small surface of the edge. The thread is drawn within an area of 1 to 2 mm. Even greater variations of the tension have no detrimental effect on the localization of the draw point. It is surprising that the temperature of the rounded edge may vary within wide limits and nevertheless the thread is drawn uniformly. It is only necessary that a certain difference exists between the temperature of the edge and the temperature of the thread.

Besides, it is possible further to heat the drawn thread, after it has left the heated edge and before it reaches the faster driven roll, by a heating device having a temperature of up to 230° C., whereby the thread is fixed.

According to the process of the invention threads are obtained which are uniformly drawn and the properties of which do not vary from point to point. Above all, threads made in this manner have a uniform dye receptivity. Fabrics made from the threads show uniform dyeings even when tested by severe methods.

It is surprising that threads which have been drawn on a rounded edge heated to 95–150° C. by passing them with contact with an arc of less than 180° over said edge for less than 15 mm. have a much smaller tendency to shrink than threads which have been drawn on a heated stationary roll having the same temperature. The process of the invention enables threads to be produced the shrinkage of which in boiling water corresponds to that of threads drawn according to a known process and fixed at 150–170° C. Since the draw point is localized on the heated edge shortly before the thread leaves said edge the heat energy set free on stretching remains in the thread. Thus the thread is heated to a temperature which is considerably above the temperature of the heated edge and fixed already during the drawing step.

As compared therewith, in the usual drawing processes the thread gives up a large part of the heat set free during drawing to the drawing roll, so that in a further step the heat required for fixing must be supplied with the aid of a special device. In view of this advantage, the process of the invention can be carried out at lower temperatures than the usual processes and nevertheless threads are obtained which have low shrinking values.

It is surprising that by the process of the invention the draw point can be almost completely localized in simple manner and the properties of the drawn structures can be improved.

In the known processes the draw point is not localized in this manner. For example, with the usual heated round body having a diameter of about 6 cm. on which the thread is heated with simultaneous increase of tension, the position of the draw point is exclusively defined by the course of temperature and tension. Any sudden disturbance of the heating or tension, as may occur by different conditions of friction or differences in the preparation, must result in a different position of the draw point, i.e., the draw point "jumps." When the thread is heated, prior to drawing, on a rotating heated roll and drawn-off from said roll at a higher speed, it is sufficiently heated since it is wrapped several times around the roll, but the draw point is situated before the draw-off point of the thread from the roll so that after drawing the thread still rubs on the surface. Due to the higher draw-off speed of the drawn thread the rotating roll acts as a stationary one so that disturbances in the tension of the thread by friction may result in a nonuniform drawing.

Moreover, when heating in this manner the temperature must be very exactly maintained. If the temperature drops, undrawn parts occur and if the temperature rises the draw point is shifted on account of the very steep drawing tension-temperature characteristics in opposite direction to the running direction of the thread, whereby the drawing is considerably disturbed.

The process of the invention is free from the aforesaid disadvantages. It can be carried out in simple and safe manner without a constant temperature being required.

The process of the invention can be carried out with the aid of various devices as illustrated by way of example in the accompanying drawings. FIGURE 1 represents a device according to which an undrawn thread 1 coming from a coil is wound several times around a heated, uniformly driven roll 2 and intermediate roll 3. The thread is heated on roll 2 and then passed with contact over a heated rounded edge 4 in a manner such that it embraces the edge with an arc of less than 180° C. Drawing occurs on heated edge 4 by means of roll 5 which has a higher speed corresponding to the desired drawing ratio. Finally, the thread is drawn-off from roll 5 and intermediate roll 6.

A further device suitable for carrying out the process of the invention is illustrated in FIGURE 2. As feed roll and draw-off roll there are used two rolls 2 and 5 which are combined on one axis and have different diameters. The undrawn thread 1 from the coil is wrapped several times around heated uniformly driven roll 2 by means of intermediate roll 3. It is then passed with contact over rounded and heated edge 4 where is it drawn, reversed by loosely running roll 7 and drawn-off over roll 5 and intermediate roll 6, roll 5 having the same speed as heated roll 2. The draw-off speed of the thread is determined by the ratio of the diameters of rolls 2 and 5.

FIGURE 3 represents a device in which the undrawn thread 1 from the coil is pressed by a rubber roll 9 against an unheated feed roll 8 from which it is conducted to heated roll 2 having the same speed. By intermediate roll 3 the thread is passed several times around roll 2. It is then drawn on rounded heated edge 4 and drawn-off by roll 5 with intermediate roll 6. In this device feed roll 8 and roll 5 are combined on one axis. The drawing ratio of the thread is defined by the ratio of the diameters of the two rolls.

FIGURE 4 illustrates the heating by means of a stationary roll. The undrawn thread 1 coming from a coil is fed to a uniformly driven roll 2 having a temperature of 60–85° C. by means of a stationary roll 10 which is likewise heated at 60–85° C. The thread is wrapped around rolls 2 and 10 several times and then passed from stationary roll 10 with an arc of less than 180° over rounded edge 4 heated at 95–150° C. The rounded edge has a surface of sintered ceramic with high mirror finish. The thread which touches said surface for less than 15 mm., is passed over loose roll 7 to roll 5 which is mounted on the same axis as roll 2 and has a higher circumferential speed according to the ratio of the radii and transported over loose roll 6, by means of which it is wrapped several times around roll 5, to a winding-up device not shown.

FIGURE 5 illustrates a device comprising a flat body and a loose roll. The undrawn thread 1 running off from a coil is conducted several times around a combination consisting of a uniformly driven roll 2, as stationary flat body 11 heated to 60–85° C. and a loose allotted roll 12. The thread is then passed over a rounded edge 4 heated at 95–150° C. and having a sintered ceramic surface with high mirror finish, the wrapping arc being smaller than 180° and the distance over which the thread touches the edge smaller than 15 mm., and conducted to roll 5 mounted on the same axis as roll 2. The circumferential speeds of rolls 2 and 5 are different according to the ratio of their radii. The thread is drawn on rounded edge 4 in proportion to said speeds, passed several times to roll 5 over roll 6 and then conducted to a winding-up device not shown.

The following examples serve to illustrate the invention, but they are not intended to limit it thereto.

*Example 1*

An undrawn thread of polyethylene terephthalate having 248 deniers and consisting of 35 individual filaments was drawn on a device as illustrated in FIGURE 1. The thread was conducted at a speed of 165 m./minute, with the aid of an intermediate roll, 5 times around a roll which had a diameter of 60 mm. and a temperature of 75° C. and passed with an arc of 140° over a rounded chromium plated mat edge heated to 100° C. where it was drawn. The edge was formed by a half-cylinder having a radius of 5 mm. The thread was drawn-off from a second roll having a circumferential speed of 600 m./minute and wound up on a bobbin. It was drawn to 3.65 times its original length. After drawing the thread had a strength of 4.53 g./den. and an elongation at break of 20.5%.

The same undrawn thread was drawn in analagous manner without being conducted over the heated rounded edge. The first roll had a temperature of 85° C.

Either thread was woven into a ribbon 5 cm. wide and dyed with the bromination product of 1,5-diamino-4,8-dihydroxy-anthraquinone. The dyebath contained 2% of the dyestuff, calculated on the weight of the ribbon, and per liter, 4 cc. of a mixture of o-phenylphenol, tetrahydronaphthalene, dimethyl formamide and methylethyl-ketone as carrier. The ribbons were dyed for 20 minutes at 100° C. The dyeing of the ribbon made from the thread which had been drawn without the use of the heated edge was distinctly non-uniform whereas the other ribbon was uniformly dyed.

*Example 2*

An undrawn thread of polyethylene terephthalate having 248 deniers and consisting of 35 individual filaments was drawn on a device as illustrated in FIGURE 2. The thread was passed at a speed of 165 m./minute 10 times around a roll which was heated to 70° C. and had a diameter of 27.8 mm., and an intermediate roll. The heated thread was conducted at an arc of 125° over a polished rounded edge heated to 110° C., the rounded part of which had a semicircular cross section with a 2.5 mm. radius. The thread was drawn on the rounded edge, diverted by an allotted roll, drawn-off from a further roll, mounted on the same axis as the heated roll, with 3.65 times the speed and wound up. The thread had a strength of 4.33 g./den. and an elongation at break of 18.9%. The thread was dyed as described in Example 1 and the dyeing was compared with that of a thread which had been drawn without the use of a heated edge. The former thread was uniformly dyed whereas the latter showed distinct variations in the dyestuff receptivity.

*Example 3*

A thread of polyethylene terephthalate as defined in Example 2 was drawn as described in said example while using as headed edge a pin having a radius of 1 mm. The thread obtained had a strength of 4.3 g./den. and an elongation at break of 19.4%. A fabric made from said thread could be uniformly dyed as described in Example 1.

*Example 4*

An undrawn thread of polyethylene terephthalate having 165 deniers and consisting of 25 individual filaments was drawn with the device illustrated in FIGURE 3. With the aid of a roll the thread was drawn-off from a coil at a speed of 274 m./minute and wrapped 7 times around a freely running roll heated to 78° C. and having the same circumferential speed and an intermediate roll and drawn while being passed at an arc of 120° over a rounded edge heated to 115° C., the round part of which had a semicircular cross section with a 2.5 mm. radius. The thread was drawn-off from a roll having 3.65 times the circumferential speed, i.e., at a speed of 1000 m./minute, and wound up. When dyed, the thread thus obtained showed a uniform dye receptivity.

When the thread was drawn in the same manner with the exception that it was not heated on a rotating roll but on a stationary roll over which it slid, it could only be wrapped once around the stationary roll since otherwise disturbances were observed. The thread could not be heated to the required temperature so that a uniform drawing of the thread, which was drawn-off at a speed of 1000 m./minute, was impossible. The thread obtained in this manner could be dyed in a very non-uniform manner only.

*Example 5*

A thread of polyethylene terephthalate having 550 denier and consisting of 75 individual filaments was drawn as described in Example 4. The rounded edge had a temperature of 125° C. and the thread was drawn-off at a speed of 600 m./minute. When dyed as described in Example 1 a fabric made from the thread of a higher titer showed an absolutely uniform tint.

*Example 6*

A thread of polyethylene terephthalate having a titer of 248 and consisting of 35 individual filaments was drawn as illustrated in FIGURE 4. The uniformly driven roll 2 had a temperature of about 60° C. and the stationary roll 10 a temperature of 79° C. The thread was wrapped 6 times around rolls 2 and 3, conducted with an arc of 130° over edge 4 having a temperature of 115° C. and a sintered ceramic surface with high mirror finish, and drawn in a ratio of 1:3.85 at a speed of 620 m./minute. The thread was woven as weft into a 5 cm. wide ribbon and the ribbon was dyed as described in Example 1. The dyeing was very uniform.

*Example 7*

(a) 88 spindles with cops having a titer of 75 (35 individual filaments) were taken from a large scale drawing plant. The threads of the cops had been drawn by passing them from a feed roll to a stationary round body having a diameter of 60 mm. and a temperature of 90° C. around which they were wrapped 2½ times, fixed on a 20 cm. long metal plate having a temperature of 150° C. and then conducted several times around the draw-off roll.

The 88 threads were subjected to a tearing test. They had an average strength of 4.8 g./den. and an average elongation at break of 23.5%. Their shrinkage was 7.6% on the average in boiling water and 18.5% at 200° C. From each of the threads a ribbon was made as described in Example 1 and the ribbons were dyed. All dyed ribbons had distinct streaks weftways (up to 12 streaks on a length of 10 cm.) resulting from the different dyeability of the threads. The medium depth of the tint measured with a remission photometer varied by ±3.3% and the peak values deviated from the mean value by up to 8.7%. A remission difference of 4% is distinctly visible with the eye.

(b) The threads of the 88 spindles were drawn as illustrated in FIGURE 5 in a ratio of 1:3.85. The heated flat body 11 had a temperature of 83° C. (±0.5°C.) and the rounded edge 4 had a temperature of 125° C. The drawn threads were drawn-off at a speed of 620 m./minute. They had a medium tensile strength of 5.2 g./den., a medium elongation at break of 17%. Although no fixing plate had been used, the threads shrunk in boiling water by 7.7% and at 220° C. by 18.3% on the average. 5 cm. wide ribbons were woven from the threads and the ribbons were dyed with the same dispersion dyestuff. Weftways no variations of the tint could be observed. The remission values varied by ±1.9%, the peak values deviated from the mean value by up to 4.1%.

I claim:

1. A process for continuously and uniformly drawing threads of a high molecular weight polyethylene terephthalate comprising passing undrawn thread which has been heated to a temperature of between 60 and 85° C. from a uniformly driven feed roller, around which feed roller said thread has been wrapped several times, over a rounded edge so that the thread contacts said edge at an arc less than 180° and over a distance of less than 15 mm. said edge being at a temperature of between 95 and 150° C. and drawing off the thread on a draw roller having a higher surface speed than said feed roller.

2. A process according to claim 1 wherein said undrawn thread is heated prior to bring wrapped around said feed roller.

3. A process according to claim 2 wherein said undrawn thread is heated by contact with a stationary body heated to 60 to 85° C.

4. A process according to claim 3 wherein said stationary body is a stationary roll.

5. A process according to claim 1 wherein said stationary body is a stationary flat body.

6. A process according to claim 1 wherein said uniformly driven feed roller is heated to a temperature of from 60° to 85° C.

7. A process according to claim 1 wherein the rounded edge is at a temperature of between 100 and 110° C.

8. A process according to claim 1 wherein said thread is further heated to a temperature up to 230° C. between leaving the rounded edge and reaching the draw roll.

9. A process according to claim 1 wherein said rounded edge has a surface of sintered ceramic with a high mirror finish.

References Cited by the Examiner

UNITED STATES PATENTS

| | | | |
|---|---|---|---|
| 2,578,899 | 12/1951 | Pace | 264—290 |
| 2,974,391 | 3/1961 | Speakman et al. | 28—72 XR |
| 3,090,077 | 5/1963 | Abbott | 18—48 |
| 3,101,990 | 8/1963 | Heighton | 264—290 |
| 3,103,407 | 9/1963 | Clark et al. | 264—290 |

FOREIGN PATENTS 1,278,659   11/1961   France.

ALEXANDER H. BRODMERKEL, *Primary Examiner.*

LESLIE H. GASTON, *Examiner.*